United States Patent [19]

Miyoshi et al.

[11] 4,041,528
[45] Aug. 9, 1977

[54] COLOR TELEVISION SIGNAL GENERATING APPARATUS FOR USE IN A SINGLE CAMERA TUBE

[75] Inventors: Tadayoshi Miyoshi; Shintaro Nakagaki; Itsuo Takanashi; Sumio Yokokawa, all of Yokohama; Kenichi Miyazaki, Sagamihara; Hisanori Tumiyama, Yokohama; Koithiro Motoyama, Kanagawa, all of Japan

[73] Assignee: Victor Company of Japan, Limited, Yokohama, Japan

[21] Appl. No.: 656,205

[22] Filed: Feb. 9, 1976

[30] Foreign Application Priority Data

| Feb. 20, 1975 | Japan | 50-20405 |
| Feb. 25, 1975 | Japan | 50-23297 |
| Mar. 1, 1975 | Japan | 50-24515 |
| Mar. 3, 1975 | Japan | 50-25782 |
| Mar. 5, 1975 | Japan | 50-25895 |

[51] Int. Cl.² .................................. H04N 9/07
[52] U.S. Cl. .................................... 358/47
[58] Field of Search ............ 358/44, 47, 21, 23, 358/36

[56] References Cited

U.S. PATENT DOCUMENTS

| 3,560,637 | 2/1971 | Takeuchi et al. | 358/44 |
| 3,647,948 | 3/1972 | Eto et al. | 358/44 |
| 3,745,238 | 7/1973 | Yoneyama | 358/47 |
| 3,808,357 | 4/1974 | Nakagaki et al. | 358/47 |
| 3,846,579 | 11/1974 | Takanashi et al. | 358/47 |
| 3,969,764 | 7/1976 | Tanaka | 358/47 |

Primary Examiner—Robert L. Griffin
Assistant Examiner—Aristotelis M. Psitos

[57] ABSTRACT

A color television signal generating apparatus comprises a color-resolving striped filter, in a camera tube, for separating the output signal of the camera tube into required signals. Detecting means detects the envelopes of specific positive wave and negative wave signals thus separated. The output of the camera tube is a superimposed signal of a direct wave signal containing signals of three primary colors, of additional mixed colors, and a high-band component signal comprising a group of modulated color signals. This camera output signal results from the amplitude modulation of a carrier wave responsive to filter stripes in the color-resolving striped filter. The carrier wave components have a high harmonic relation relative to two primary color signals. The separating means comprises first separating means for separating the direct signal from the above mentioned superimposed signal and second separating means for separating the high-band component signal. The envelope detecting means comprises a first detector for producing a demodulated output signal in accordance with an envelope resulting from a successive connection of peak values of the positive wave of the thus separated high-band component signal. A second envelope detection means produces a demodulated output signal in accordance with an envelope resulting from a successive connection of peak values of the negative wave of the thus separated high-band component signal.

6 Claims, 16 Drawing Figures

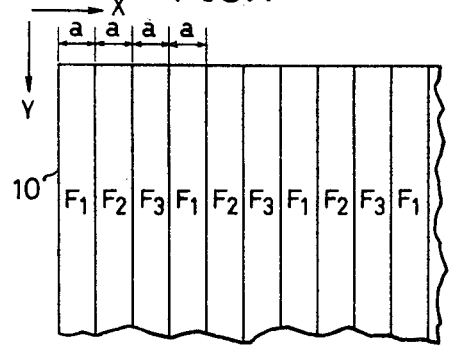
FIG.1
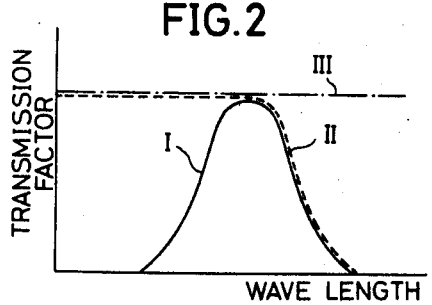
FIG.2
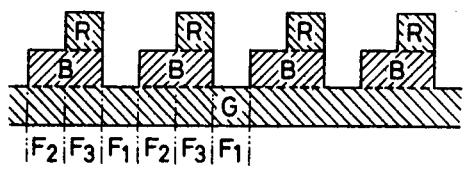
FIG.3
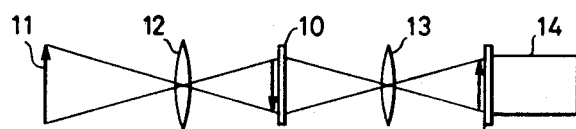
FIG.4
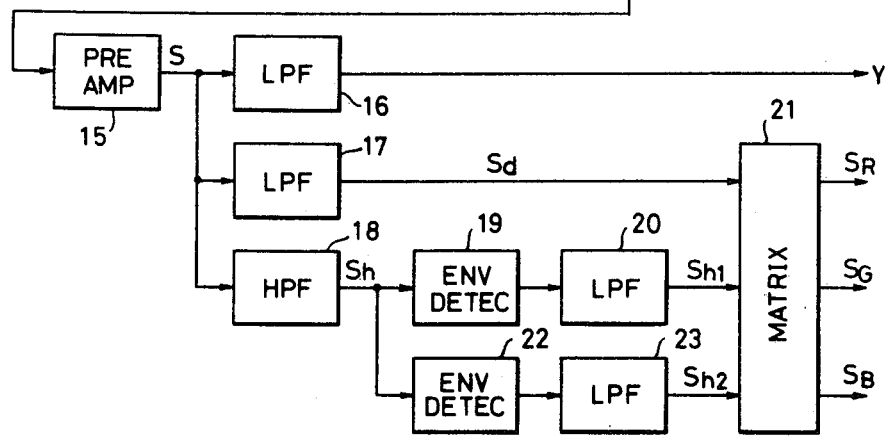

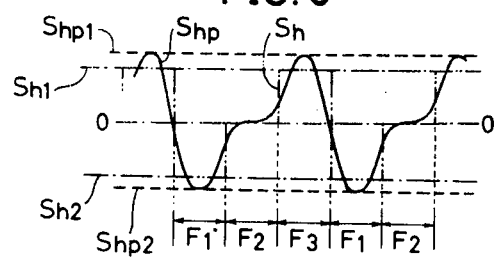
FIG. 9
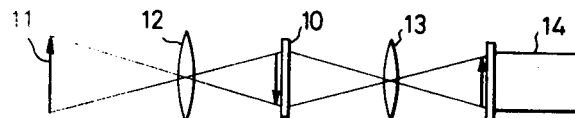
FIG. 10
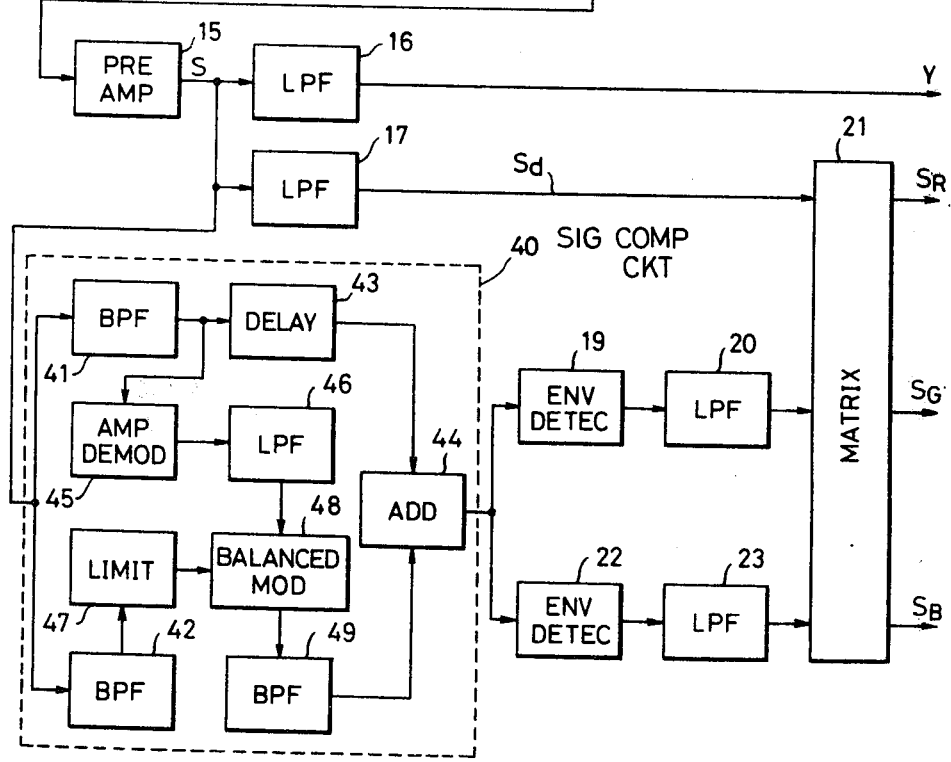

COLOR TELEVISION SIGNAL GENERATING APPARATUS FOR USE IN A SINGLE CAMERA TUBE

BACKGROUND OF THE INVENTION

This invention relates generally to an apparatus for generating color television signals and more particularly to such an apparatus for use in a color television image-pickup device, such as a color television camera.

Among the simple types of known color television cameras, there is a so-called single-tube type in which a single pickup or camera tube, having a color-resolving striped filter in its optical system, is used to generate luminance signals and color signals. Also, a color television camera has two tubes in one pickup or camera tube. One tube is used for generating luminance signals, and the other tube has a color-resolving striped filter within its optical system to generate color signals.

In either of the above mentioned color television camera types, the color-resolving striped filters are of the phase-separation or the frequency-separation system.

In a color-resolving striped filter of the phase-separation type, however, there has been the disadvantageous requirement that the color-resolving striped filter have a complicated organization, including index stripes. Another disadvantageous requirement is that a complicated has been required for generating sampling pulses on the basis of information obtained from these index stripes. A further problem is that noise results in the conversion of color information signals by a "sampling hold" of a dot-sequential system. In this system, a signal is obtained by sampling and inadvertently introducing noise of high frequency into simultaneous color information signals included in the dot-sequential. The color information signals become stretched along the time axis and are converted into noise of conspicuously low frequency, whereby the signal-to-noise ratio becomes low.

A color-resolving striped filter of the frequency-separation system does not encounter the above described difficulties accompanying a known color-resolving striped filter of the phase-separation system. However, there are interference fringes (moire), due to various causes, since two sheets of striped filters of different space frequency values are fabricated in combination. In addition, the frequency fluctuation of a carrier wave generated in the output signal, as a result of non-linearity of the deflection system of the camera tube, is a large problem. Often, there are further difficulties, such as shading due to a difference in degrees of modulation, at the peripheral region and the central region in the target surface of the camera tube.

SUMMARY OF THE INVENTION

It is a general object of the present invention to provide a new and useful color television signal generating apparatus which overcomes the above described difficulties.

More specifically, an object of the invention is to provide a color television signal generating apparatus which does not require index stripes in the color-resolving striped filter, as found in a phase-separation system. Here, an object is to avoid interference fringes (moire), shading, and other deleterious effects, as found in a frequency-separation system.

Another object of the invention is to provide a color television signal generating apparatus having means for detecting the envelopes of the positive wave and negative wave of a separated high-band component signal. In particular, an object is to obtain two two-color mixture signals with a simple circuit.

Still another object of the invention is to provide a color television signal generating apparatus having means for eliminating noise in an existing frequency band portion which is unnecessary for reproduction of color signals and means for separating a high-band component signal. By means of the apparatus of the present invention, color signals of large S/N ratio can be obtained.

Other objects and further features of the present invention will be apparent from the following detailed description with respect to preferred embodiments of the invention when read in conjunction with the accompanying drawings.

BRIEF DESCRIPTION OF THE DRAWINGS

In the drawings:

FIG. 1 is an enlarged, fragmentary frontal view of one embodiment of a color-resolving striped filter for use in the color television signal generating apparatus of the present invention;

FIG. 2 is a graphical representation indicating the transmission characteristics of respective filter stripes of a color-resolving striped filter shown in FIG. 1;

FIG. 3 is a diagram indicating the energy distribution of transmitted light when white light is projected onto the color-resolving striped filter shown in FIG. 1;

FIG. 4 is a combined optical and block diagram illustrating a first embodiment of a color television signal generating apparatus, according to the present invention;

FIG. 9 is a diagram indicating the waveform of a composed high-frequency band signal component produced by a signal composing circuit in FIG. 8;

FIG. 10 is a combined optical and block diagram showing a third embodiment of the color television signal generating apparatus according to the invention;

DETAILED DESCRIPTION

Figure 5:
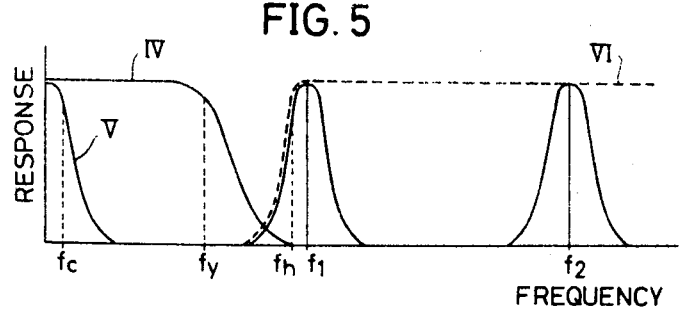
FIG. 5 is a graphical representation indicating the frequency responses of the output signal of a camera tube and the filtering characteristic of a filter in the apparatus of the invention.

One embodiment of a color-resolving striped filter for use in the apparatus of the present invention is illustrated in FIG. 1. The color-resolving striped filter 10 is made up of first, second, and third filter stripes F1, F2, and F3 of equal widths a. Each stripe has an oblong, narrow shape in the vertical direction. The stripes are laid consecutively and contiguously in the order named above, stripes F1, F2, and F3 constituting one group. A plurality of such groups are laid consecutively and contiguously side-by-side in a single place. The widths of these filter stripes may be selected at will. These filter stripes F1, F2 and F3, of all groups, extend in the direction (direction Y in FIG. 1) which is perpendicular to the horizontal scanning direction (direction X in FIG. 1). The stripes are arrayed in an orderly manner in the above mentioned sequence, and all filter stripes have the same spatial frequency.

The light transmitting characteristics respectively of these filter stripes F1, F2 and F3 are as follows. The first filter stripe F1 is adapted to transmit light of one primary color from among the three primary colors (red, green, and blue) of addition mixed colors. The second filter stripe F2 is adapted to transmit light of mixed colors of the primary color transmitted through the first filter stripe and one of the two remaining primary colors (i.e. not the primary color transmitted through the first filter stripe). The third filter stripe F3 is adapted to transmit the light of all colors (e.g. white light).

More specifically, the second filter stripe F2 is capable of transmitting light of colors respectively having the following relationships, depending on whether the primary color transmitted through the first filter stripe F1 is red, green or blue.

| Primary color light transmitted through first filter stripe F1 | Color of light transmitted through second filter stripe F2 |
|---|---|
| red light | magenta (red blue) or yellow (red green) |
| green light | yellow (red green) or cyan (blue green) |
| blue light | magenta (red blue) or cyan (blue green) |

In one example of a color-resolving striped filter 10 of the above described organization, the first filter stripe F1 is adapted to have a transmission characteristic I (FIG. 2) to transmit green light (G). The second filter stripe F2 is adapted to have a transmission characteristic II to transmit the light of a mixture color of blue light (B) and green light (G) (that is, cyan (C)). The third filter stripe F3 is adapted to have a transmission characteristic III to transmit the light of all colors, that is, white light (W) or a mixed color light of red light (R), green light (G), and blue light (B).

If these filter stripes F1, F2, and F3 have such light transmitting characteristics, the energy state of the light transmitted when a white light (W) is projected onto the color-resolving striped filter 10 is as illustrated by one example in FIG. 3, in which the horizontal direction (X-axis direction) represents energy distribution. That is, green light (G) is continuously distributed since it is transmitted through all filter stripes F1, F2 and F3. Blue light (B) is distributed over a width 2a separated by space intervals a, since it only passes through the filter stripes F2 and F3. Red light (R) is distributed over a width a separated by space intervals of 2a since it is only transmitted through the filter stripe F3.

The color television signal generating apparatus, according to the present invention, in which the above described color-resolving striped filter 10 is used will now be described with respect to one embodiment thereof and with reference to FIG. 4.

In the apparatus diagrammatically represented in FIG. 4, the image light from an object 11 to be televised passes through the camera lens 12 of a single tube type color television camera and forms an image on the color-resolving striped filter 10. The optical image thus formed on this filter 10 is transmitted by way of a relay lens 13 and forms an image on the photoconductive surface (or photoelectric surface) of a camera tube 14.

When a color-resloving, striped filter 10 of the characteristic indicated in FIG. 2 is used, and a white light image is introduced as incident light passing through the camera lens 12, the resulting output signal S obtained from the camera tube 14. This light can be represented as a periodic function having a fundamental repetitive period described by the pitch of the respective stripes of the color-resolving striped filter. This signal is represented by the following Fourier series:

$$S = SG + \frac{2}{3} SB + \frac{1}{3} SR - \frac{3}{2\pi} (SB + SR)\sin\omega t \quad (1)$$

$$- \frac{\sqrt{3}}{2\pi} (SB - SR)\cos\omega t - \frac{3}{4\pi} (SB + SR)\sin 2\omega t$$

$$- \frac{\sqrt{3}}{4\pi} (SR - SB)\cos 2\omega t +$$

The output signal S represented by the above equation (1) is also represented as $S = Sd + Sh \ldots$ (2), where the signal Sd is a direct wave (DC component) signal comprising a mixture of a luminance signal Y, a green light signal Sg, a blue light signal SB, and a red light signal SR. The resulting signal can be represented by $$Sd = SG + 2SB/3 + SR/3 \ldots \quad (3)$$

The signal Sh is a high-band component (AC component) signal comprising a group of modulated color signals having forms resulting from amplitude modulation of specific carrier wave and other carrier waves with a mixture signal. The specific carrier wave has a frequency which is the same as the space frequency determined by the number of groups of filter stripes F1, F2 and F3 of the color-resolving striped filter 10. The other carrier waves have frequencies which are the same as higher harmonics of the specific carrier wave. The mixture signal is made up of two primary colors other than the primary (which is green color light in the instant example) passing through the first filter stripe F1.

The above mentioned output signal S of the camera tube 14 is amplified by a preamplifier 15. Then, it is supplied to low-pass filters 16 and 17 and a high-pass filter 18. The low-pass filter 16 has a filtering characteristic shown by curve IV (FIG. 5), which is an upper-limit cut-off frequency fy of approximately 2.5 MHz. A luminance signal Y is derived from the output signal of filter 16 (curve IV). The low-pass filter 17 has a filtering characteristic shown by curve V, with an upper-limit cut-off frequency fc of approximately 0.5 MHz, from which the above mentioned direct signal Sd is derived. The high-pass filter 18 has a filtering characteristic shown by curve VI with a lower-limit cut-off frequency fh. The above mentioned high-band component signal Sh is derived from the signal of curve VI.

In FIG. 5, frequency f1 indicates a carrier wave of a frequency which is determined by the number and space frequency of filter stripe groups of the color-resolving striped filter 10, this frequency being approximately 3.25 MHz, for example, when there are 170 groups of the filter stripes. The frequency f2 indicates the second harmonics (of approximately 6.5 MHz) of the carrier wave of the above mentioned frequency f1.

If a color-resolving striped filter having the characteristic indicated in FIG. 3 is used, only a modulated color signal having a component of the signal SB due to blue light $B$ and a modulated color signal having a component of the signal SR due to red light $R$ exist in the signal Sh. A signal component due to green light $G$ is not contained therein. The angular frequencies $\omega$ and $2\omega$ and the above mentioned frequencies $f1$ and $f2$ have the relationships $\omega = 2\pi f1$ and $2\omega = 2\pi f2$.

Figure 6:
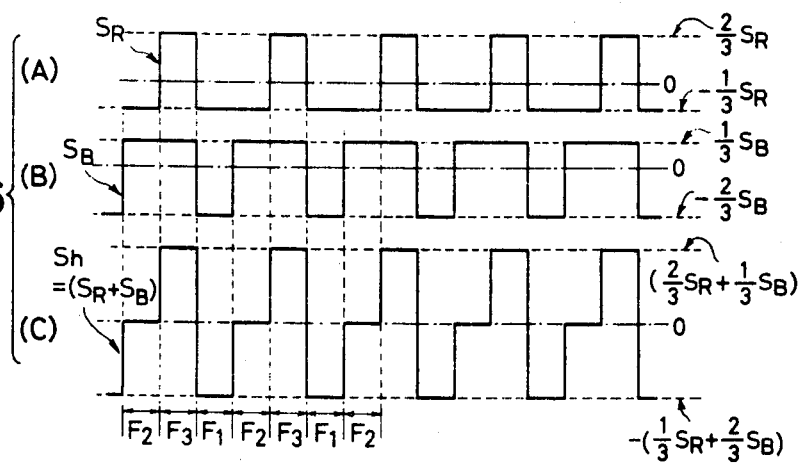
FIGS. 6(A), 6(B), and 6(C) are diagrams respectively indicating waveforms of high-frequency band components produced as output signals of a high-pass filter when the incident light on the color television image-pickup apparatus is red, blue, and white, respectively.

When only red light reaches the camera lens 12, the high-band component signal Sh is only the red signal SR indicated in FIG. 6(A). When only a blue light is imparted, the high-band component signal Sh becomes only the blue signal SB indicated in FIG. 6(B). Furthermore, when a white light is imparted to the camera, the high-band component signal Sh becomes a signal of a waveform as indicated in FIG. 6(C).

Here, the interval on the time axis within which the red signal SR and the blue signal SB can be generated is determined by the positions of the filter stripes F1, F2, and F3. For this reason, there is a constant phase relationship between the blue signal SB and the red signal SR when these two signals are simultaneously present, at any point on the time axis.

Accordingly, if the red signal SR of the waveform indicated in FIG. 6(A) and the blue signal SB of the waveform indicated in FIG. 6(B) are mixed, the resulting signal is a high-band component signal Sh of the waveform indicated in FIG. 6(C). In FIGS. 6(A), 6(B), and 6(C), the lines 0-0 represent the average zero level (alternating current axis) of the respective signals. The peak value of the positive wave of the red signal SR (FIG. 6(A)) is ⅔SR. The peak value of the negative wave thereof is −⅓SR. The peak value of the positive wave of the blue light SB (FIG. 6(B)) is ⅓SB, while the peak value of the negative wave thereof is − ⅔SB. Furthermore, the peak value of the positive wave of the high-band component signal Sh (FIG. 6(C)) is (⅔SR + ⅓SB), while the peak value of the negative wave thereof is − (⅓SR + ⅔SB).

Figure 7A:
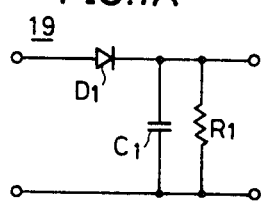
FIGS. 7A and 7B are circuit diagrams respectively showing examples of envelope detector circuits, for use in the apparatus of the invention.
Figure 7B:
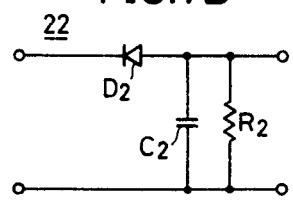

The high-band component signal Sh is indicated in FIG. 6(C) which has been derived from the high-pass filter 18. Single Sh is supplied respectively to envelope detector circuits 19 and 22, where the positive wave and negative wave, respectively, are envelope detected. For example, FIG. 7A shows the envelope detector circuit 19 comprising a forward-direction diode D1, a capacitor C1, and a resistor R1. A demodulated output corresponds to an envelope resulting from a successive connection of peak values of the positive wave of the high-band component signal Sh. For example, FIG. 7B shows the envelope detector circuit 22 comprising a reverse direction diode D2, a capacitor C2, and a resistor R2. A demodulated output corresponds to an envelope resulting from a successive connection of peak values of the negative wave of the high-band component signal Sh.

The output demodulated signals of the envelope detector circuits 19 and 22 are supplied to a matrix circuit 21 by way of low-pass filters 20 and 23, as signals Sh1 and Sh2. The low-pass filters 20 and 23 may be provided, if necessary, and their pass-band width may be the same as that of the above mentioned low-pass filter 17.

The signals Sh1 and Sh2 thus supplied from the envelope detector circuits 19 and 22 to the matrix circuit 21 correspond respectively to the envelopes of the positive and negative waves of the high-band component signal Sh. For this reason, these signals can be expressed by the following equations:

$$Sh1 = (\tfrac{2}{3}SR + \tfrac{1}{3}SB) \ldots \quad (4)$$

$$Sh2 = -(\tfrac{1}{3}SR + \tfrac{2}{3}SB) \ldots \quad (5)$$

The matrix circuit 21 receives these signals Sh1 and Sh2 together with the direct-wave signal Sd, which is represented by Eq.(3), from the low-pass filter 17. As a result, the matrix circuit 21 produces three primary color output signals SG, SR, and SB for green, red, and blue.

$$SG = Sd + Sh2 \ldots \quad (6)$$

$$SR = (Sh1 \times 2) + Sh2 \ldots \quad (7)$$

$$SB = -\{(Sh2 \times 2) + Sh1\} \ldots \quad (8)$$

The apparatus of the present invention has the following advantageous features.

1. Since a filter comprising filter stripes F1, F2, and F3 of respectively equal space frequency are used for the color-resolving striped filter, moire does not occur.

2. Since the system is not a phase separation system, stripes are not necessary for generating index pulses in the color-resolving striped filter, the camera tube, and other parts. Therefore, the color-resolving striped filter and the camera tube become simple and can be readily fabricated. Furthermore, since the rate of utilization of the incident light is improved, a bias light is unnecessary.

3. By adjusting the spectral response characteristics of the filter stripes F1, F2 and F3 of the color-resolving striped filter and the spectral response characteristic of the camera tube, the output levels of the three primary color signals SR, SG and SB respectively become equal when there is a pick up of an all-color light (white light). It is easy to reduce the shading which is due to the modulation degree characteristic of the camera tube.

4. The positive and the negative waves of the high-band component signal are, respectively, envelope detected to obtain two 2-color mixture signals. Thus, it is possible to provide a color television signal generating apparatus with an excellent performance, which is simple and can be produced at low cost.

It is desirable for the high-pass filter 18 to have uniform amplitude and phase characteristics, over the entire region of its pass band. In actual practice, however, it is difficult to obtain a high-pass filter having such ideal characteristics. Furthermore, other factors prevent an ideal characteristic. For example, the diameter of the electron beam of the camera tube is not infinitely small. Also, the degree of modulation of the camera tube decreases in the high-frequency band. As a result of these various causes, the high-band signal component Sh, obtained from the high-pass filter 18, has many waveform distortions.

On one hand, the alternating-current component contained within the output signal of the camera tube is not distributed uniformly throughout the entire band. Instead, it has a distribution wherein, as indicated in FIG. 5, a carrier wave f1 has a fundamental frequency value f1 determined by the number of groups of filter stripes of the color resolving striped filter 10. The information content exists only in the vicinity of this fundamental and the vicinity of the higher harmonics thereof. In contrast, the noise present within the output signal S of the camera tube is distributed uniformly over the entire band. For this reason, when the high-pass filter 18 separates the high-band signal component Sh from the camera tube output signal S, the S/N ratio of the resulting high-band signal component Sh deteriorates greatly.

Furthermore, in a color television system, in general, the band of a color signal considered to be necessary for color reproduction may be relatively narrow, for example, ± 500 KHz for an NTSC system. For this reason, it is more advantageous from the viewpoint of the S/N ratio to limit the band if this will not have a deleterious effect on color reproduction, with respect to also the high-band signal component Sh.

Figure 8:
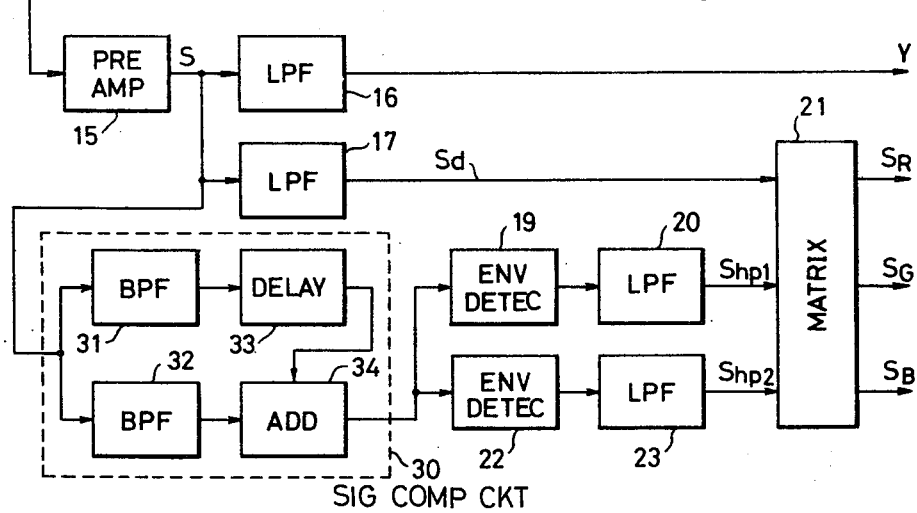
FIG. 8 is a combined optical and block diagram showing a second embodiment of the color television signal generating apparatus, according to the invention.

Next to be described is a second embodiment of the invention, in which the above described problems associated with the high-pass filter 18 have been solved. In FIG. 8, those parts which are the same as corresponding parts in FIG. 4 are designated by like reference numerals, and a detailed description of such parts will be omitted.

In FIG. 8, a signal composing circuit 30 is used in place of the high-pass filter 18 shown in FIG. 4. The output signal S of the preamplifier 15 is supplied to the low-pass filters 16 and 17 and, at the same time, to band-pass filters 31 and 32 of the signal composing circuit 30. The band-pass filter 31 has a center frequency, a pass-band width, and cut-off characteristic required for extracting from the output signal S of the camera tube those frequencies which are in the vicinity of the carrier wave (fundamental signal) f1, which is a frequency determined by the number of groups of the filter stripes of the color-resolving striped filter. The band-pass filter 32 has a center frequency, pass-band width, and cut-off characteristic required for extracting from the output signal S of the camera tube those frequencies which are in the vicinity of the second harmonic wave signal $f2$.

The fundamental wave output signal component of the band-pass filter 31 is supplied through a delay circuit 33 to an adder 34. The second harmonic wave output signal component of the band-pass filter 32 is supplied directly to the adder 34.

In this case, the delay circuit 33 may be provided, if necessary, so that the output signals of the band-pass filters 31 and 32 supplied to the adder 34 will have the same time delay. Accordingly, the delay circuit 33 may be provided on either the input side of the band-pass filter 31 or the output side of the band-pass filter 31. Furthermore, if the delay characteristics of the band-pass filters 31 and 32 are equal, this delay circuit 33 is unnecessary.

The adder 34 mixes, in suitable proportions, and amplifies the fundamental wave signal component and the second harmonic signal component supplied thereto.

The adder output is a composed harmonic signal component Shp, which is supplied to envelope detector circuits 19 and 22. This composed harmonic signal component Shp can be used in place of the above mentioned high-band signal component Sh, as will now be explained.

When the high-band component signal Sh (FIG. 6(C)) is expanded in a Fourier expansion to determine the component up to and including the second harmonic, the following expression is obtained. This equation represents the content of the composed harmonic component signal Shp having a waveform as indicated in FIG. 9.

$$Shp = -\frac{3(SR + SB)}{2\pi}\sin\omega t - \frac{\sqrt{3}(SB - SR)}{2\pi}\cos\omega t \qquad (9)$$
$$-\frac{3(SR + SB)}{4\pi}\sin\omega t - \frac{\sqrt{3}(SR - SB)}{4\pi}\cos 2\omega t$$

When this Eq.(9) is arranged in the form of the sum of the fundamental wave signal component and the second harmonic component signal, the following equation is obtained:

$$Shp = A\sin(\omega t + \phi) + \frac{A}{2}\sin(2\omega t - \phi) \qquad (10)$$

$$\text{where, } A = -\sqrt{\frac{3(SR^2 + SR \cdot SB + SB^2)}{\pi^2}}$$

$$\phi = \tan^{-1}\frac{\sqrt{3}(SB - SR)}{3(SR + SB)}$$

The envelope detector circuits 19 and 22 detect the peak value of the positive wave and the peak value of the negative wave of the composed harmonic signal component Shp, represented by the above Eq.(10). These peak values of the positive wave and the negative wave of the composed harmonic signal component Shp are determined in correspondence with the above Eq.(10). When this signal is differentiated, the resulting differential becomes zero.

$$\frac{d(Shp)}{d(\omega t)} = 2A\cos(\frac{3}{2}\omega t) \cdot \cos(\frac{\omega t - 2\phi}{2}) \qquad (11)$$

Eq.(11) becomes zero when $\omega t$ is $\pi/3$, $-\pi/3$, $(\pi + 2\phi)$, or $(2\phi - \pi)$. Of these cases, that wherein $\omega t$ is $(\pi + 2\phi)$ or $(2\phi - \pi)$ corresponds to the point of inflection, of intermediate value. Therefore, the value of $\omega t$ for maximum and minimum values of Eq.(10) are $\pi/3$ and $-\pi/3$.

When $\omega t = -\pi/3$ is substituted in Eq.(9), the peak value Shp1 of the positive wave of the composed harmonic signal component Shp becomes as represented by Eq.(12), below. When $\omega t = \pi/3$ is substituted in Eq.(9), the peak value Shp2 of the negative wave becomes as represented by Eq.(13), below;

$$Shp1 = \frac{9\sqrt{3}}{4\pi}(\frac{2}{3}SR + \frac{1}{3}SB) \qquad (12)$$

$$Shp2 = -\frac{9\sqrt{3}}{4\pi}(\frac{1}{3}SR + \frac{2}{3}SB) \quad (13)$$

When the signals Shp1 and Shp2 in these Eqs.(12) and (13) are compared with the signals Sh1 and Sh2 of Eqs. (4) and (5), it is seen that the signals Shp1 and Shp2 are merely the signals Sh1 and Sh2 respectively multiplied by a specific coefficient $9\sqrt{3}\pi$. The mixture ratios of the two primary color signals respectively in Eqs.(4) and (12) and Eqs.(5) and (13) are the same. It is apparent, therefore, that merely by appropriately changing the circuit of the matrix circuit 21, three primary color signals SR, SG, and SB can be obtained. These color signals are the same as those obtained in the first embodiment as illustrated in FIG. 4 and the second embodiment as shown in FIG. 8.

The instant embodiment of the invention affords the following advantageous features.

1. In the composed harmonic signal component obtained by the signal composing circuit 30, there is no admixing of noise existing in a frequency band part which is unnecessary for reproduction of color signals. Therefore, color signals of a large S/N ratios can be obtained.

2. By merely causing the fundamental wave signal component and the second harmonic signal component to have the same time delay and by adding these two signals, it is possible to carry out a delayed phase compensation of the signals of the entire color television camera system.

3. The amplitudes of the two signals to be added by the adder 34 can be respectively adjusted to obtain a good color reproduction.

Then, it is apparent from Eq.(10) that the amplitude component coefficient A of the fundamental wave component of the first term on the right side of the equation and the amplitude component coefficient A/2 of the second harmonic component of the second term on the right side are always in the ratio of 2:1. Furthermore, the phase angle $\phi$ is $(+\phi)$ with respect to the fundamental wave component and is $(-\phi)$ with respect to the second harmonic component.

In general, the modulation characteristic of the camera tube is such that the degree of modulation drops abruptly as the frequency becomes high, the drop being a result of effects such as the beam aperture. Furthermore, because of effects such as the output capacity of the camera tube and the input capacity of the preamplifier, the attenuation increases with increasing frequency. The amplitude coefficient of the second harmonic component signal within the harmonic component signal derived from the camera tube output signal S is a value which is less than the value of A/2, which is necessary for faithful color reproduction. Consequently, the S/N ratio of the second harmonic signal component is smaller than the S/N ratio of the fundamental wave signal component.

As a consequence, deterioration of the S/N ratio due to the above described cause will be present in this signal even if the fundamental wave signal component and the second harmonic signal component are added in specific proportions. The proportions are such that the amplitude component coefficients will become 2:1 with respect to the fundamental wave component and the second harmonic component, thereby forming a combined harmonic signal component.

Accordingly, it was observed that the requirements which should be fulfilled by the combined harmonic signal components are: (1) that the amplitude component coefficients in the fundamental wave signal component and the second harmonic signal component always have the relationship of 2:1, and (2) that the phase angle in the fundamental wave signal component and the phase angle in the second harmonic signal component have the relationship of $(+\phi)$, $(-\phi)$.

Next, a third embodiment (FIG. 10) of the invention will be described. Color television signals having an even better S/N ratio than the ratio in the second embodiment can be generated by using only the phase variation part of a second harmonic signal component of a deteriorated S/N ratio. An amplitude variation is formed of the second harmonic signal component from the amplitude component of the fundamental wave signal component of good S/N ratio. In FIG. 10, those parts which are the same as corresponding parts in FIG. 4 are designated by like reference numerals. Description of such parts will be omitted.

The output signal S of the preamplifier 15 is supplied to low-pass filters 16 and 17 and, at the same time, to band-pass filters 41 and 42 of a signal combining circuit 40. Thus, the camera tube output signal S is applied to the band-pass filter 41 which has a pass-band filtering characteristic whereby it passes only a fundamental wave signal component in the vicinity of the carrier wave f1. The frequency f1 is determined by the number of groups of filter stripes of the color-resolving striped filter 10. The band-pass filter 42 has a pass-band filtering characteristic whereby it passes only a second harmonic signal component in the vicinity of the second harmonic f2 of the fundamental wave.

The output fundamental wave signal component of the band-pass filter 41 is supplied by way of a delay circuit 43 to an adder 44 and, at the same time, to an amplitude demodulator 45, which supplies an amplitude signal component corresponding to an amplitude component coefficient A in Eq.(10). This amplitude signal component is sent through a low-pass filter 46, which removes the undesirable signal component. The resulting signal is then supplied to a balanced modulator 48.

The second harmonic signal component from the band-pass filter 42 is supplied to an amplitude limiter 47, where a phase-modulated wave component is extracted and supplied to the above mentioned balanced modulator 48. The balanced modulator 48 carries out a balanced modulation, with the amplitude signal component from the low-pass filter 46 acting as a signal wave and the phase-modulated wave component from the amplitude limiter 47 acting as a carrier wave. The balanced modulated wave output signal passes through a band-pass filter (low-pass filter) 49, where its undesired signal component is removed. Thereafter it is supplied to the adder 44, where it is mixed with a specific ratio and amplified with the fundamental wave signal component from the delay circuit 43.

In this case, the phase modulated wave signal component extracted from the second harmonic signal component is balanced modulated in the balanced modulator 48 responsive to an amplitude signal component extracted from a fundamental wave signal component of large S/N ratio. For this reason, a second harmonic signal component is obtained, as represented by $(A/2)\sin(2\omega t - \phi)$, which is the second term on the right side of the above given Eq.(10). Therefore, from the adder 44, there is obtained a combined harmonic signal component which has the same signal constitution as the combined harmonic signal components obtained from the adder 34. Moreover, the adder output has an S/N ratio which has been improved over that of the latter signal.

In Eq.(10), furthermore, the fundamental wave signal component and the second harmonic signal have a relationship of 2:1. For this reason, color reproduction, with a large S/N ratio, is possible without the occurrence of large color errors, even if only the amplitude component of either one of the two signals is used as the amplitude component.

Figure 11:
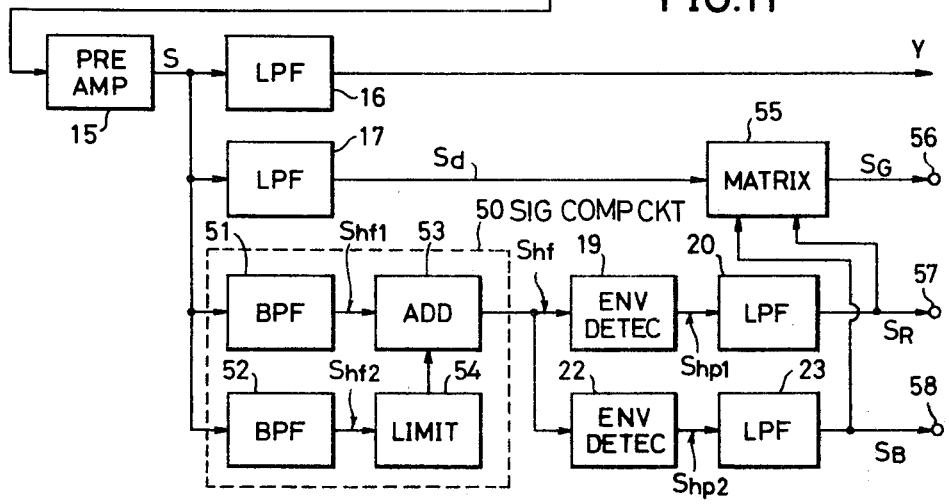
FIG. 11 is a combined optical and block diagram showing a fourth embodiment of the color television signal generating apparatus according to the invention.

FIG. 11 shows an embodiment of the invention wherein the frequency component and the phase component are respectively used directly as they are, with respect to the fundamental wave signal component, the second harmonic signal component, and the amplitude component. In FIG. 11, those parts which are the same as corresponding parts in FIG. 4 are designated by like reference numerals, and description of these parts will be omitted.

The output signal S of the preamplifier 15 is supplied to low-pass filters 16 and 17 and, at the same time, band-pass filters 51 and 52 of a signal composing circuit 50. A fundamental wave signal component (carrier wave) Shf1 in the vicinity of a fundamental frequency $f1$, is obtained from the band-pass filter 51 and supplied to an adder 53. A second harmonic signal component Shf2, in the vicinity of a second harmonic wave $f2$ of a carrier wave $f1$, is obtained from the band-pass filter 52. Signal Shf2 is amplitude limited by an amplitude limiter 54 and thus made a phase modulated signal component having a constant amplitude. This phase modulated signal component is added to the above mentioned fundamental wave signal component in the adder 53.

In this instance, the second harmonic signal component is represented by the second term of the right side of Eq.(10). It is amplitude limited by the amplitude limiter 54. As a consequence, its amplitude coefficient A/2 is a constant amplitude K, determined by amplitude limiter 54. Accordingly, the extracted phase modulated signal Shf2 is represented by the following equation:

$$Shf2 = K\sin(2\omega t - \phi)$$

Therefore, the composed harmonic signal component Shf, which is led out of the adder 53, is represented as follows:

$$Shf = Shf1 + Shf2 = A\sin(\omega t + \phi) + K\sin(2\omega t - \phi) \ldots \quad (14)$$

This composed harmonic signal component Shf is supplied to envelope detector circuits 19 and 22, where its positive wave and negative wave are envelope detected, and first and second demodulated primary color signals are respectively led out. In this instance, the signals obtained by the envelope detection are determining the maximum and minimum values of the above given Eq.(14). By differentiating this Eq.(14), $$\frac{d(Shf)}{d(\omega t)} = \frac{A}{2K}\cos(\omega t + \phi) + \cos(2\omega t - \phi) \quad (15)$$

is obtained. Then, the value of $\omega t$ which makes Eq.(15) equal to zero is substituted into Eq.(14).

The mixing ratio of the adder 53 is set so that the coefficients A and K in Eq.(15) have the relationship A << K. Then, the conditions for producing maximum and minimum values are: $\omega t = \phi/2 - \pi/4$ and $\omega t = \phi/2 + \pi/4$, by which $\cos(2\omega t - \phi)$ in Eq.(15) becomes zero. By substituting the above condition $\omega t = \phi/2 - \pi/4$ for $\omega t$ in Eq.(14), the envelope detection output Shfp1 is determined with respect to the positive wave, as indicated by the following Eq.(16). By substituting the above condition $\omega t = \phi/2 + \pi/4$ for the $\omega t$ in Eq.(14), the envelope detection output Shfp3 (with respect to the negative wave) is indicated by the following Eq.(17):

$$Shfp1 = -(K + \frac{A}{\sqrt{2}}\sqrt{1 - \sin(3\phi)}) \quad (16)$$

$$Shfp2 = K + \frac{A}{\sqrt{2}}\sqrt{1 + \sin(3\phi)} \quad (17)$$

The envelope detection outputs represented by these Eqs.(16) and (17) are demodulated primary-color signals. However, merely by observing these two equations, it is difficult to perceive immediately that they are demodulated primary-color signals. Accordingly, in order to facilitate an understanding, an example will be taken when a light of a specific color is introduced as incident light into the camera. Next to be described is the nature of the signals obtained from the envelope detector circuits 19 and 22, respectively, at the time when this light of the specific color is introduced as incident light.

The following table indicates the output signals Shfp1 and Shfp2 obtained respectively from the envelope detector circuits 19 and 22 when the incident light entering the camera is: a red light (the same with a yellow light, that is, the case where blue light is zero); a blue light (the same with a cyan light, that is, the case where red light is zero); and a magenta light (the same with a white light, that is, the case where red light and blue light are equally included).

| Detection output | Incident light Red light (SB = 0) | Blue light (SR = 0) | Magenta light (SR = SB) |
|---|---|---|---|
| Shfp1 | $-(K + \frac{\sqrt{3}}{\pi} SR)$ | $-K$ | $-(K + \sqrt{\frac{3}{2}} \cdot \frac{\sqrt{3}}{\pi} SR)$ |
| Shfp2 | $K$ | $K + \frac{\sqrt{3}}{\pi} SB$ | $K + \sqrt{\frac{3}{2}} \cdot \frac{\sqrt{3}}{\pi} SB$ |

It is apparent that the coefficient K is a DC component; therefore, if K is zero, the DC component in the signal is removed. A red color signal SR will then be obtained by itself from the envelope detector circuit 19, and a blue color signal SB will be obtained by itself from the envelope detector circuit 22.

If a comparison is made of the levels of the output signals produced by the envelope detector circuits 19 and 22 when a white light (or a magenta light) enters the camera as incident light and when a red light (or a blue light) only enters the camera as incident light, it is observed that the level in the former case becomes $\sqrt{3}/2 = 0.816$ times the level in the latter case. This is apparent from the above table. Conversely stated, the level in the latter case is approximately 18 percent lower than that in the latter case, and the degree of saturation decreased by approximately 18 percent. However, a decrease of this order has almost no adverse effect in actual practice.

The detected signals produced as outputs of the envelope detector circuits 19 and 22 are respectively passed through lowpass filters 20 and 23. There, their carrier wave components are amply attenuated. Thereafter, the signals are respectively led out as a red light signal SR and blue light signal SB through output terminals 57 and 58 and, at the same time, supplied to a matrix circuit 55. The matrix circuit 55 matrixes a three-color mixture signal from the low-pass filter 17 and the demodulated primary-color signals SR and SB from the low-pass filters 20 and 23, with a specific amplitude ratio and polarity. As a result, in this instance, a green signal SG is produced as an output from the matrix circuit 55 and is led out through an output terminal 56.

The spectral sensitivities of the lenses 12 and 13 used in the optical system of the camera may differ in parts. Fabrication errors may exist in the color-resolving striped filter 10. There may be irregularities in the spectral sensitivity of the photoelectric conversion layer of the camera tube 14. The shape of the spot of the electron beam of the camera tube 14 may vary during scanning. The scanning velocity of the electron beam may vary in parts. A fluctuation having a detrimental effect on color reproduction may be produced in the phase of the modulated signal wave in the output signal S of the camera tube 14. In such a case, undesirable color shading is produced in the reproduced picture.

Accordingly, the occurrence of this color shading can be prevented by eliminating the various causes mentioned above. However, carrying out countermeasures with respect to each of these causes is quite difficult in actual practice, and the apparatus becomes very expensive. In one embodiment of the present invention as described below, this color shading is prevented by a color shading correction circuit.

Figure 12:
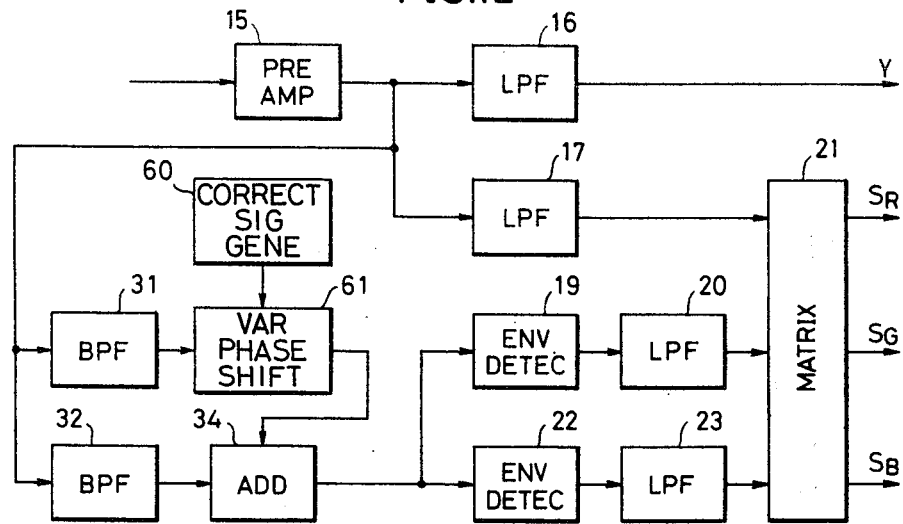
FIGS. 12, 13 and 14 are block diagrams respectively showing various embodiments of color shading correction circuits which can be applied to the apparatus of the invention.

FIG. 12 is a block schematic diagram showing one embodiment of a color shading correction circuit applied to the apparatus of the invention illustrated in FIG. 8. In FIG. 12, parts which are the same as corresponding parts in FIG. 8 are designated by like reference numerals. Detailed description of such parts will not be repeated.

Figure 15:
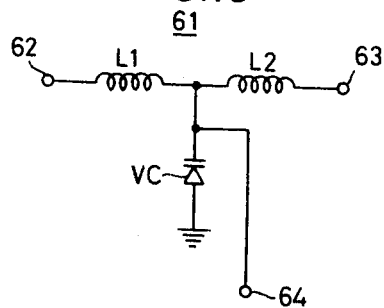
FIG. 15 is a circuit diagram of one example of a variable phase shifter for use in the circuits illustrated in FIGS. 12, 13, and 14.

A signal generating circuit 60 generates a color shading correction signal and supplies it to a variable phase shifter 61. This variable phase shifter 61 also receives a fundamental wave signal component from the band-pass filter 31. A delay time imparted to this fundamental wave signal component is controlled in accordance with the color shading correction signal thus supplied. The variable phase shifter 61 comprises, for example, as shown in FIG. 15, coils L1 and L2 and a variable capacitance diode VC. Accordingly, a signal is supplied from the band-pass filter 31 to an input terminal 62 of this variable phase shifter 61. During the interval before it reaches an output terminal 63 of this circuit, it receives a time delay in accordance with the capacitance value of the variable capacitance diode VC, which is varied by the correction signal applied through a terminal 64.

The amount of time delay (i.e., the variation of phase) of the fundamental wave signal component constituting one part of the combined harmonic signal component is controlled in a manner to eliminate color shading in the reproduced picture. For this purpose, as described above, a color shading correction signal is generated by circuit 60 for controlling the amount of time delay. For this color shading correction signal, a wave such as, for example, a triangular wave or parabolic wave of horizontal scanning period, a triangular or parabolic wave of vertical scanning period, or a composite wave of these waves is used in accordance with the state of generation of color shading in the reproduced picture.

Figure 13:
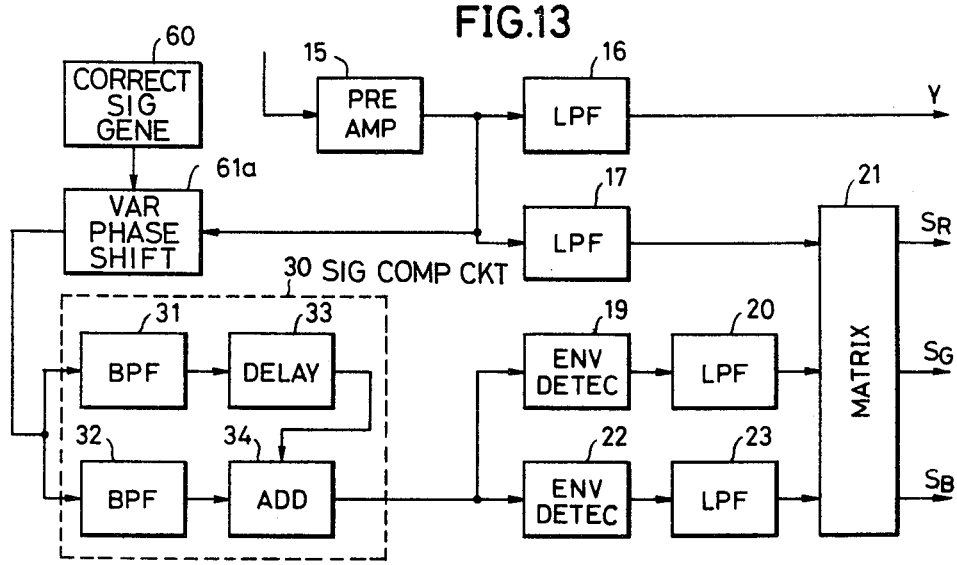

FIG. 13 shows a modification of the apparatus shown by block diagram in FIG. 8 in which a variable phase shifter 61a is interposed between the preamplifier 15 and the signal combining circuit 30.

Figure 14:
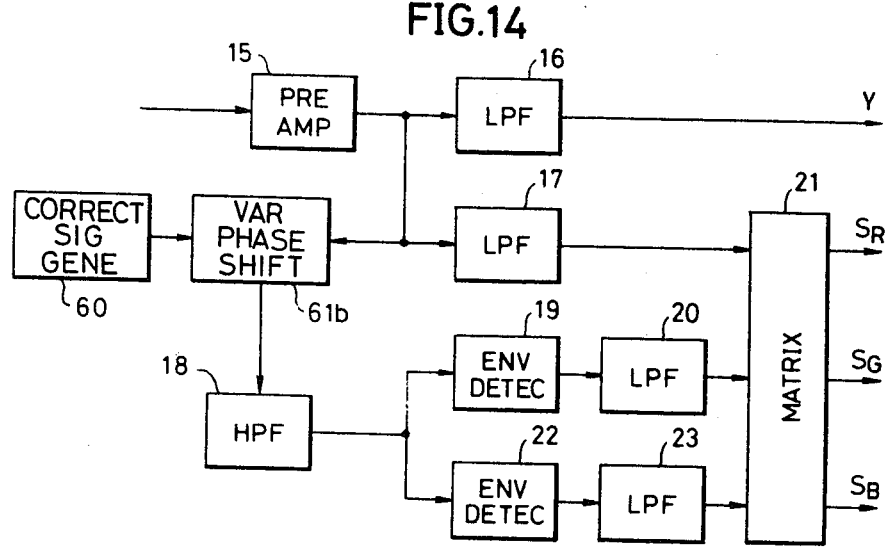

In another embodiment of the apparatus as shown in FIG. 14, a variable phase shifter 61b is interposed between the preamplifier 15 and the high-pass filter 18 of the apparatus shown by block diagram in FIG. 4.

Further, this invention is not limited to these embodiments but various variations and modifications may be made without departing from the scope and spirit of the invention.

What we claim is:

1. A color television signal generating apparatus comprising:
a color-resolving striped filter comprising a plurality of groups of filter stripes, said groups being disposed in parallel and consecutively in a sequentially repeated arrangement, each of said groups comprising at least three filter stripes from among
a first filter stripe having a light transmission characteristic for transmitting the light of one of the three primary colors of an addition mixture color,
a second filter stripe having a light transmission characteristic for transmitting the light of a mixed color which includes the primary color transmitted through said first filter stripe and one of the other two primary colors, and
a transparent third filter stripe for transmitting white light,
said at least three filter stripes being arranged in parallel and consecutively in a specific sequence;
a camera tube having said color-resolving striped filter disposed on the front surface thereof and producing a superimposed output signal comprising, in superimposition:
a direct wave signal containing signals of the three primary colors of said addition mixture color, and
a high-band signal component comprising a group of modulated color signals resulting from an amplitude modulation of a carrier wave by the signals of two primary colors other than the primary color of the light transmitted through said first filter stripe, said carrier wave having a frequency equal to a space frequency determined by the number of said groups of filter stripes, and said carrier wave also having frequency components which are higher harmonics of the frequency of said carrier wave;

low-pass filter means for separating said direct wave signal from the output signal of said camera tube;

first band-pass filter means for separating a fundamental carrier wave signal component having a frequency equal to the space frequency of the filter stripes from the high-band signal component of said output signal of said camera tube;

second band-pass filter means for separating a harmonic signal component having a second harmonic relationship to the frequency of the fundamental carrier wave signal component from said high-band signal component;

adding means for adding the output signals of said first and second band-pass filter means in such a ratio that the amplitude of the fundamental carrier wave signal component is substantially twice that of the harmonic signal component in the output of said adding means;

first envelope detection means for producing a demodulated signal responsive to an envelope formed by successively connecting positive peak values of the output signal of said adding means;

second envelope detection means for producing a demodulated signal responsive to an envelope formed by successively connecting negative peak values of the output signal of said adding means; and matrix means responsive to the output signals of said low-pass filter means and the first and second envelope detection means for producing three primary color output signals.

2. A color television signal generating apparatus as claimed in claim 1 further comprising delay means in a signal path including one of the first and second band-pass filter means thereby to cause the output signals of said first and second band-pass filter means to be supplied with the same delay time to said adding means.

3. A color television signal generating apparatus as claimed in claim 1 further comprising signal generating circuit means for generating a color shading correction signal, and variable phase shifter means disposed between said first band-pass filter means and said adding means for imparting to the output signal of said first band-pass filter means a variable delay time controlled in accordance with the color shading correction signal to eliminate a color shading which may be produced in the output signal of said matrix means.

4. A color television signal generating apparatus as claimed in claim 2 further comprising signal generating circuit means for generating a color shading correction signal, variable phase shifter means responsive to the output signal of said camera tube for imparting to the output signal of said camera tube a variable delay time controlled in accordance with the color shading correction signal to eliminate a color shading which may be produced in the output signal of said matrix means, and means for supplying the output signal of said variable phase shifter means to the first and second band-pass filter means.

5. A color television signal generating apparatus comprising:

a color-resolving striped filter comprising a plurality of groups of filter stripes, said groups being disposed in parallel and consecutively in a sequentially repeated arrangement, each of said groups comprising at least three filter stripes from among a first filter stripe having a light transmission characteristic for transmitting the light of one of the three primary colors of an addition mixture color, a second filter stripe having a light transmission characteristic for transmitting the light of a mixed color which includes the primary color transmitted through said first filter stripe and one of the other two primary colors, and a transparent third filter stripe for transmitting white light, said at least three filter stripes being arranged in parallel and consecutively in a specific sequence;

a camera tube having said color-resolving striped filter disposed on the front surface thereof and producing a superimposed output signal comprising, in superimposition:

a direct wave signal containing signals of the three primary colors of said addition mixture color, and a high-band signal component comprising a group of modulated color signals resulting from an amplitude modulation of a carrier wave by the signals of two primary colors other than the primary color of the light transmitted through said first filter stripe, said carrier wave having a frequency equal to a space frequency determined by the number of said groups of filter stripes, and said carrier wave also having frequency components which are higher harmonics of the frequency of said carrier wave;

low-pass filter means for separating said direct wave signal from the output signal of said camera tube;

first band-pass filter means for separating a fundamental carrier wave signal component having a frequency equal to the space frequency of the filter stripes from the high-band signal component of said output signal of said camera tube;

second band-pass filter means for separating a harmonic signal component having a second harmonic relationship to the frequency of the fundamental carrier wave signal component from said high-band signal component;

amplitude demodulation means for demodulating the output carrier wave signal component from said first band-pass filter means and for producing an amplitude signal component of the fundamental carrier wave signal component;

limiting means for limiting the amplitude of the output signal of said second band-pass filter means and for obtaining a phase-modulated signal of constant amplitude;

modulator means responsive to the output signal of said amplitude demodulation means for amplitude-modulating a carrier wave formed by the output signal of said limiting means;

adding means for adding the output signal of said first band-pass filter means and the output signal of said modulator means in a ratio such that the amplitude of the fundamental carrier wave signal component is substantially twice that of the output signal of said modulator means in the output of said adding means;

first envelope detection means for producing a demodulated signal responsive to an envelope formed by successively connecting positive peak values of the output signal of said adding means;

second envelope detection means for producing a demodulated signal responsive to an envelope formed by successively connecting negative peak values of the output signal of said adding means; and matrix means responsive to the output signals of said low-pass filter means and the first and second envelope detection means for producing three primary color output signals.

6. A color television signal generating apparatus comprising:

a color-resolving striped filter comprising a plurality of groups of filter stripes, said group being disposed in parallel and consecutively in a sequentially repeated arrangement, each of said groups comprising at least three filter stripes from among a first filter stripe having a light transmission characteristic for transmitting the light of one of the three primary colors of an addition mixture color, a second filter stripe having a light transmission characteristic for transmitting the light of a mixed color which includes the primary color transmitted through said first filter stripe and one of the other two primary colors, and a transparent third filter stripe for transmitting white light, said at least three filter stripes being arranged in parallel and consecutively in a specific sequence;

a camera tube having said color-resolving striped filter disposed on the front surface thereof and producing a superimposed output signal comprising, in superimposition:

a direct wave signal containing signals of the three primary colors of said addition mixture color, and a high-band signal component comprising a group of modulated color signals resulting from an amplitude modulation of a carrier wave by the signals of two primary colors other than the primary color of the light transmitted through said first filter stripe, said carrier wave having a frequency equal to a space frequency determined by the number of said groups of filter stripes, and said carrier wave also having frequency components which are higher harmonics of the frequency of said carrier wave;

low-pass filter means for separating said direct wave signal from the output signal of said camera tube;

first band-pass filter means for separating a fundamental carrier wave signal component having a frequency equal to the space frequency of the filter stripes from the high-band signal component of said output signal of said camera tube;

second band-pass filter means for separating a harmonic signal component having a second harmonic relationship to the frequency of the fundamental carrier wave signal component from said high-band signal component;

limiting means for limiting the amplitude of the output signal of said second band-pass filter means and for obtaining a phase-modulated signal of constant amplitude;

adding means for adding the output signal of said first band-pass filter means and the output signal of said limiting means in a ratio such that the amplitude of the phase-modulated signal is greater than that of the fundamental wave signal component in the output of said adding means;

first envelope detection means for producing a demodulated signal responsive to an envelope formed by successively connecting positive peak values of the output signal of said adding means;

second envelope detection means for producing a demodulated signal responsive to an envelope formed by successively connecting negative peak values of the output signal of said adding means;

means for obtaining a first primary color signal responsive to the output signal of said first envelope detection means;

means for obtaining a second primary color signal responsive to the output signal of said second envelope detection means; and means for matrixing the output signal of said low-pass filter means and the first and second primary color signals thereby to obtain a third primary color signal.

* * * * *